(12) United States Patent
Graziani

(10) Patent No.: US 9,784,553 B2
(45) Date of Patent: Oct. 10, 2017

(54) APPARATUS FOR CHECKING DIMENSIONS AND/OR SHAPE OF A MECHANICAL PART

(71) Applicant: Marposs Societa' Per Azioni, Bentivoglio (IT)

(72) Inventor: Enrico Graziani, Bentivoglio (IT)

(73) Assignee: Marposs Societa' Per Azioni, Bentivoglio (BO) (IT)

( * ) Notice: Subject to any disclaimer, the term of this patent is extended or adjusted under 35 U.S.C. 154(b) by 154 days.

(21) Appl. No.: 14/895,057

(22) PCT Filed: Jun. 17, 2014

(86) PCT No.: PCT/IB2014/001095
§ 371 (c)(1),
(2) Date: Dec. 1, 2015

(87) PCT Pub. No.: WO2014/203062
PCT Pub. Date: Dec. 24, 2014

(65) Prior Publication Data
US 2016/0102959 A1      Apr. 14, 2016

(30) Foreign Application Priority Data

Jun. 17, 2013   (IT) .............................. BO2013A0303

(51) Int. Cl.
*G01B 3/38*       (2006.01)
*G01B 3/46*       (2006.01)

(52) U.S. Cl.
CPC ..................... *G01B 3/46* (2013.01)

(58) Field of Classification Search
CPC ...... G01B 3/46; G01B 5/012; G01B 2210/58; G01B 5/12; G01B 7/28; G01B 5/08; G01B 5/207; G01B 5/252

USPC ........................................... 33/542
See application file for complete search history.

(56) References Cited

U.S. PATENT DOCUMENTS

| | | | | |
|---|---|---|---|---|
| 4,597,184 A | * | 7/1986 | Golinelli | G01B 7/12 33/501.1 |
| 4,625,413 A | * | 12/1986 | Possati | G01B 7/12 33/501.1 |
| 4,926,559 A | | 5/1990 | Knäbel | |
| 5,088,206 A | * | 2/1992 | Golinelli | B23Q 1/36 33/520 |

(Continued)

OTHER PUBLICATIONS

International Preliminary Report on Patentability and Written Opinion PCT/1132014/001095 dated Jun. 17, 2014 (5 pages).

*Primary Examiner* — Yaritza Guadalupe-McCall
(74) *Attorney, Agent, or Firm* — Blank Rome LLP

(57) ABSTRACT

An apparatus for checking dimensions and/or shape includes one or more feelers (7,8;9;67,68), three for preference, adapted to touch the surface of a mechanical part (2;61) to be checked, a transducer and/or display device (33;78) with a movable part (34;77), and a mechanical transmission assembly (20) to transmit to the movable part of the transducer and/or display device the displacements of the feeler/s. The mechanical transmission assembly includes a shaft (22) defining an axis (A) and a guiding element (30) adapted to house a guide portion (25) of the shaft. The shaft includes a resiliently deformable portion (26), that is preferably a reduced diameter portion having axial symmetry, in an intermediate position between the guide portion and an abutment portion (27).

12 Claims, 5 Drawing Sheets

(56) References Cited

U.S. PATENT DOCUMENTS

| | | | | |
|---|---|---|---|---|
| 5,205,047 A | * | 4/1993 | Danielli | G01B 7/13 33/542 |
| 5,351,410 A | * | 10/1994 | Hainneville | G01B 5/08 33/542 |
| 5,746,003 A | | 5/1998 | Baruchello | |
| 6,226,883 B1 | * | 5/2001 | Golinelli | G01B 7/001 33/556 |
| 6,298,571 B1 | * | 10/2001 | Dall'Aglio | B24B 5/42 33/555.1 |
| 7,024,785 B2 | * | 4/2006 | Dall'Aglio | B24B 5/42 33/550 |
| 7,607,239 B2 | * | 10/2009 | Dall'Aglio | B24B 5/42 33/555.1 |
| 8,429,829 B2 | * | 4/2013 | Arnold | B24B 5/42 33/555.1 |
| 8,725,446 B2 | * | 5/2014 | Wegmann | G01B 5/003 33/555.1 |
| 8,991,064 B2 | * | 3/2015 | Trionfetti | B24B 49/045 33/552 |
| 2004/0055172 A1 | * | 3/2004 | Danielli | B24B 5/42 33/555.1 |
| 2004/0137824 A1 | * | 7/2004 | Dall'Aglio | B24B 49/04 451/8 |
| 2006/0130349 A1 | * | 6/2006 | Jordil | G01B 5/012 33/559 |
| 2008/0188854 A1 | | 8/2008 | Moser | |
| 2011/0314685 A1 | * | 12/2011 | Dalla Casa | G01B 3/46 33/542 |
| 2016/0102959 A1 | * | 4/2016 | Graziani | G01B 3/46 33/542 |

* cited by examiner

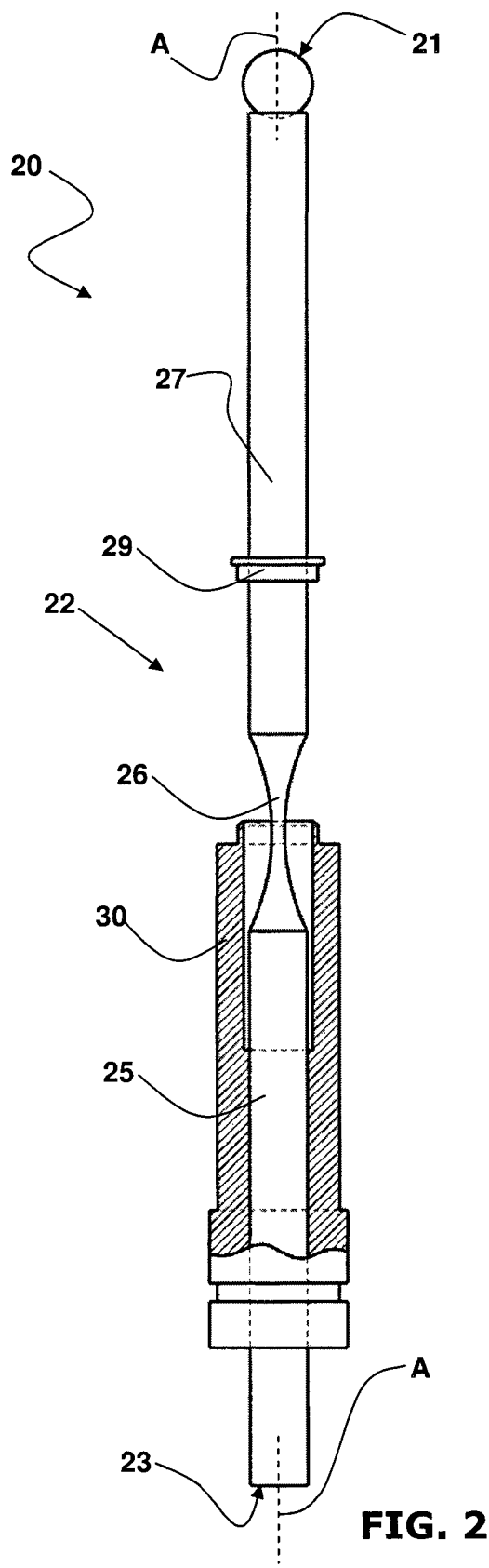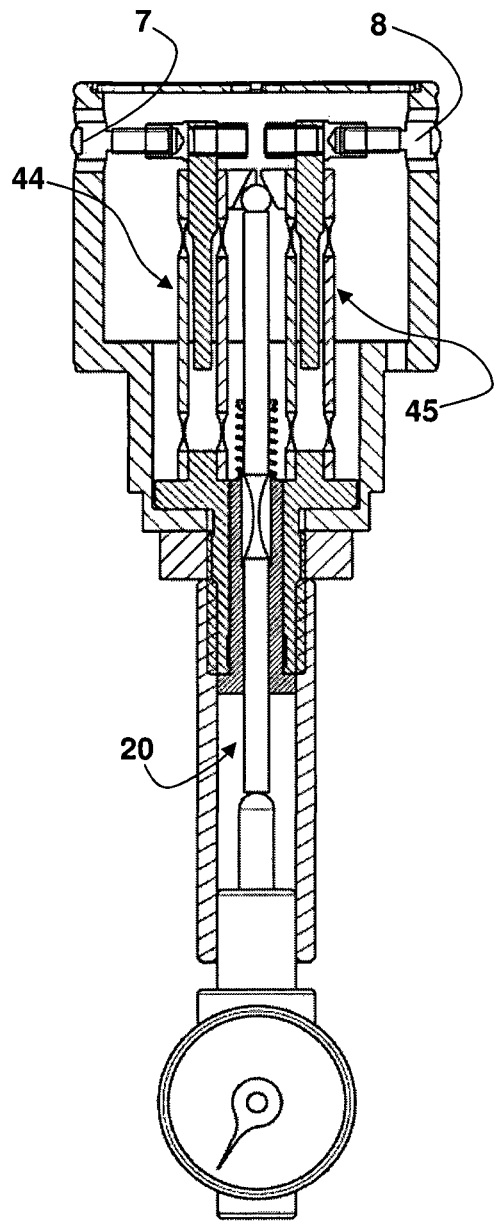
FIG. 2
FIG. 3

APPARATUS FOR CHECKING DIMENSIONS AND/OR SHAPE OF A MECHANICAL PART

TECHNICAL FIELD

The present invention refers to an apparatus for checking dimensions and/or shape of a mechanical part comprising a supporting frame, one or more feelers, movable with respect to the supporting frame and adapted to touch a surface of the mechanical part to be checked, an armset coupled to the supporting frame, carrying the feeler/s and including one or more thrust surfaces in correspondence of the feeler/s, the abutment portion of the shaft defining an end abutment surface that is in contact with the thrust surface/s of the armset, a transducer and/or display device, for detecting displacements of the feeler/s, including a movable part, and a mechanical transmission assembly coupled to the feeler/s and to the transducer and/or display device and including a shaft defining an axis, and a guiding element adapted to cooperate with the shaft and to guide movements of the shaft along an axial direction, the movable part of the transducer and/or display device being adapted to move substantially along the axial direction.

BACKGROUND ART

Known apparatuses for checking dimensions and/or shape errors of workpieces comprise one or more feelers that touch the surface of the piece to be checked and are coupled to a housing by means of armsets allowing them to perform limited displacements. The displacements of the feelers, detected by transducer and/or display devices, for instance inductive transducers, or mechanical gauges, typically indicate variations of the checked dimension with respect to a nominal value. Mechanical transmission assemblies may comprise an axially movable shaft that has one end in contact with the feeler/s and the other one with a movable element of the transducer device.

Such an apparatus is shown, for instance, in U.S. Pat. No. 4,170,831 which makes specific reference to a so-called "plug" comparator for checking hole diameters, with a housing, two transversally movable feelers and a mechanical transmission assembly with a shaft having at an end thereof proper sloping surfaces in contact with spherical surfaces solid with the feelers. The shaft is axially movable within the housing and features, at the opposite end, a transversal surface that is kept in contact with a movable element of a dial indicator that is also connected to the housing. The axial displacements of the shaft are guided by a mechanism featuring, for instance, mutually coupled cylindrical surfaces defined by the shaft and the housing, and can include proper sliding bushings, ball bearings or similar known devices.

It is generally difficult to correctly dimension the mechanism guiding the shaft while assuring the right coupling between the feelers and the end of the shaft. In fact, in case that a guide is chosen constraining the axial displacement substantially free of play, the coupling with the feelers may be improper, and, besides, the unavoidable transversal stresses due to the radial displacement of the feelers may give rise to jamming and seizures. On the other hand, if a not negligible backlash is present, so that a better coupling with the feelers is guaranteed, it is possible that the shaft lean with respect to the axial displacement direction: in the latter case, even minor angular displacements—improper and unnoticed—of the transversal surface that is in contact with the dial indicator, cause the latter to provide wrong indications.

The need to have a mechanical transmission assembly properly sized is ever increasing when the required precision increases, for instance in case that the dial indicator is replaced by a more sensitive inductive or optical transducer, or a transducer of a different kind. Additionally, it is economically disadvantageous to employ high accuracy items in apparatuses having a simple construction and low cost components.

The problem is most acute in comparators having three feelers arranged, for instance, at 120° one from the other, where it is very difficult to reach an acceptable compromise solution by means of the known systems. In fact, it is particularly complex to guarantee the proper coupling between the end of the shaft and all three feelers, that can move each independently from the others, and in the meantime to have the shaft guided with an acceptable backlash.

There are also known comparators, for instance plug comparators like the ones shown in U.S. Pat. No. 5,746,003, where the feelers directly act on an axially movable part of a transducer with neither separate transmission devices therebetween, nor guiding mechanisms distinct from and additional to the guiding parts that are inside the transducer as a part of the latter. Even though some resilient portions or elements are connected to the transducer to facilitate the transmission of the displacements of the feelers, the assembling procedure of the comparator, involving such resilient portions/elements, needs particularly high precision and care and, as a consequence, is lengthy and burdensome. Moreover, the axial guide of the movement is entirely left to the guiding parts of the transducer, the latter—that is a delicate device per se—being so susceptible to unusual transversal stresses that may cause jamming and/or breakages.

DISCLOSURE OF THE INVENTION

An object of the present invention is to provide a checking apparatus which overcomes the problems of the known solutions, is accurate, reliable robust and easy to assemble.

This and other objects are achieved by a checking apparatus according to the appended claims.

A checking apparatus according to the present invention includes a mechanical transmission assembly with simple and low cost components, with particularly good features as far as ruggedness, reliability and accuracy are concerned.

A checking apparatus according to the present invention includes a supporting frame, one or more feelers, movable with respect to the supporting frame, to touch the surface of a piece to be checked, and a transducer and/or display device for detecting displacements of the feeler/s. The apparatus also includes a mechanical transmission assembly coupled to the feeler/s and the transducer device, with a shaft defining an axis and having a guide portion, at least partially housed in a guiding element or bushing, an abutment portion that cooperates with the feeler/s and an intermediate resiliently deformable portion, having for instance a decreasing diameter and rotational symmetry with respect to the axis of the shaft. The guide portion of the shaft includes an end transversal surface in contact with a movable part of the transducer device that can move substantially along an axial direction. The abutment portion of the shaft defines an end abutment surface that stands in contact with one or more thrust surfaces of a movable armset that is connected to the supporting frame and carries the feeler/s. A preferred embodiment includes three feelers arranged, for instance, at 120° one from the other, connected to an armset with three movable arms allowing each feeler to move and to cooperate with the mechanical transmission assembly independently from the other two.

BRIEF DESCRIPTION OF THE DRAWINGS

The present invention is hereinafter described with reference to the attached sheets of drawings given by way of non-limiting examples, wherein:

FIG. 2 is a lateral view, partially cross-sectioned, of a mechanical transmission assembly that is used in a checking apparatus according to the present invention;

FIG. 3 is a longitudinal cross-sectional view of a checking apparatus, more specifically a "plug" comparator, according to a second embodiment of the invention;

BEST MODES FOR CARRYING OUT THE INVENTION

Figure 1:
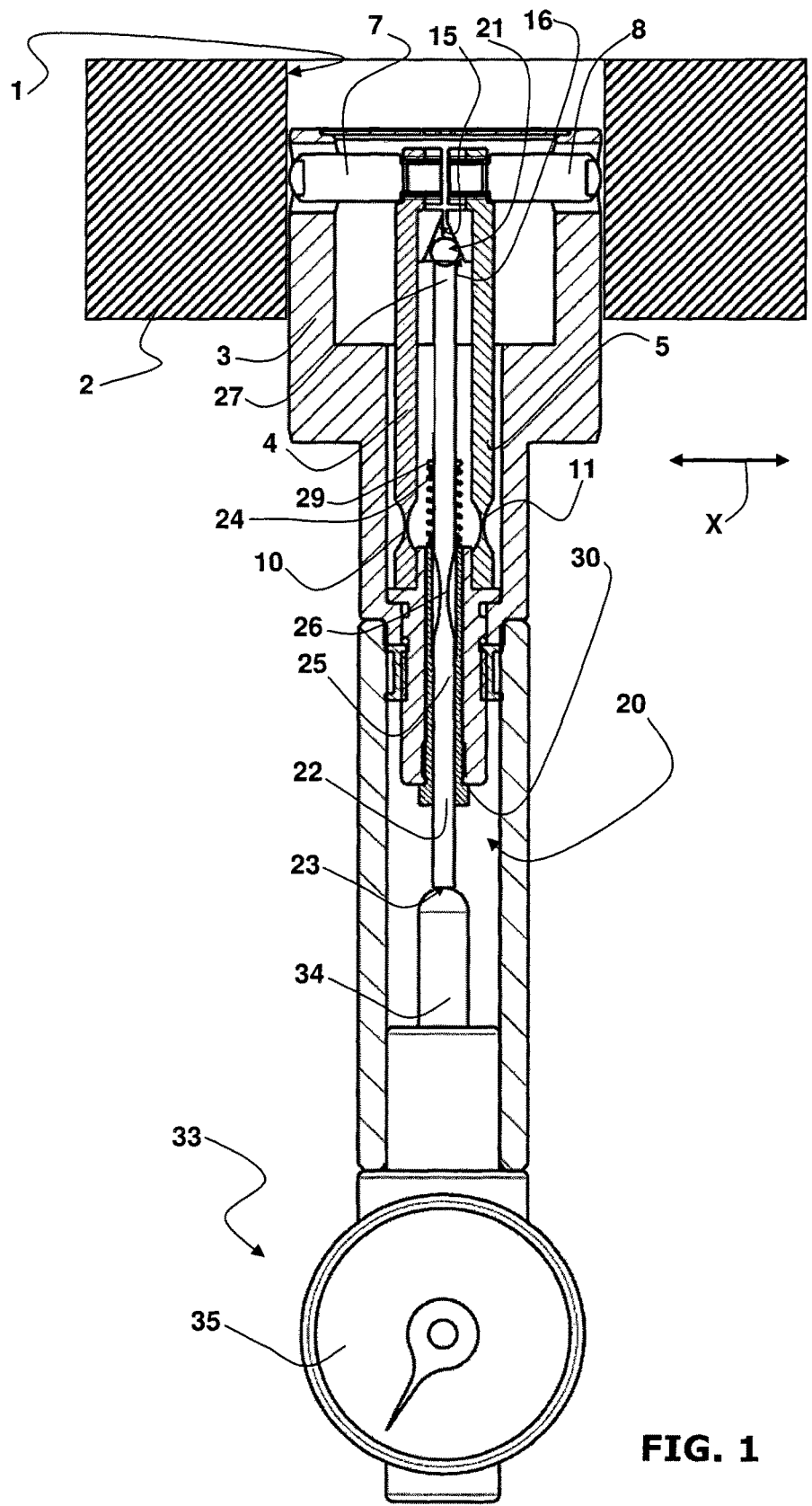
FIG. 1 is a longitudinal cross-sectional view of a checking apparatus, more specifically a "plug" comparator, according to a first possible embodiment of the invention.

FIG. 1 shows a checking apparatus according to the present invention, more specifically a "plug" comparator for checking dimensions and/or shape of a cylindrical hole 1 of a mechanical part schematically drawn and indicated with reference number 2.

The apparatus includes a housing or supporting frame 3 and an armset—fixed to the supporting frame 3—with a pair of arms 4 and 5 carrying feelers 7 and 8, oppositely arranged to each other at relative free ends, so as to touch the surface of the hole 1 to be checked on diametrically opposite positions. The arms 4, 5 include reduced thickness zones that define fulcra 10, 11 and allow the feelers 7, 8 to make limited displacements.

At free ends of the arms 4 and 5, on positions opposite to the feelers 7 and 8, thrust surfaces 15 and 16 are defined. The thrust surfaces 15 and 16 are inclined and mutually facing, and are in contact with an abutment surface 21, having a substantially spherical shape, belonging to a mechanical transmission assembly 20 that includes a shaft 22 and a guiding element or bushing 30.

The thrust surfaces 15 and 16 can be substantially plane surfaces or, most commonly, feature a groove, having for instance a V profile, so as to cooperate in a proper and repeatable way with the abutment surface 21.

The mechanical transmission assembly 20 is connected to the frame 3 of the checking apparatus for instance by means of a threaded coupling, per se known and not shown in detail, at the guiding bushing 30, and the shaft 22 has a first end defining the above-mentioned abutment surface 21, and a second end with a transversal surface 23, the latter cooperating with a free end of an axially movable part or shaft 34 of a transducer and/or display device that is fixed to the frame 3 and includes, for instance, a known mechanical clock or dial indicator 33, such as the one that is shown in the above-described U.S. Pat. No. 4,170,831, wherein the axial movement of the shaft 34 is transmitted by means of proper mechanisms to the needle of a dial 35. A spring 24, between the guiding bushing 30 and a proper abutment flange 29 integral with the shaft 22, keep the abutment surface 21 in contact with the thrust surfaces 15 and 16.

Displacements of the feelers 7 and 8, and of the thrust surfaces 15 and 16, consequent to variations of the diametral dimensions of the cylindrical hole 1, are transmitted to the shaft 22 of the mechanical transmission assembly 20 that is pushed to translate along an axial direction. The transversal surface 23 of the shaft 22 pushes the axially movable part 34 of the indicator 33, the latter providing information about the variations of the checked dimension of the hole 1.

FIG. 2 shows in an enlarged scale the mechanical transmission assembly 20 basically including two components, the shaft 22 and the guiding element or bushing 30. It is to be noted that, in FIG. 2, spring 24 is not shown for clarity reasons, while the guiding bushing 30 is substantially identical to the one that, in FIG. 1, is depicted with some different constructive details, the latter being just required for the fixing to the frame 3 of the specific checking apparatus.

The shaft 22 defines an axis A and includes a guide portion 25, an end of which defining the transversal surface 23, that is at least partially housed in the guiding bushing 30, and is guided to perform high precision displacements along an axial direction.

The shaft 22 also includes an abutment portion 27 adapted to cooperate with the feelers 7, 8, an end of which defining the abutment surface 21, the latter having a substantially spherical shape and, in the apparatus of FIG. 1, standing in contact with the thrust surfaces 15 and 16 of the arms 4 and 5. As a rule, the abutment surface 21 is intended to keep contact with properly shaped surfaces of movable parts of checking apparatuses the displacement of which have to be transmitted to associated transducer and/or display devices; other examples will be shortly described below.

A resiliently deformable portion 26 of the shaft 22 between the guide portion 25 and the abutment portion 27 features, for instance, a reduced diameter cross-section, more specifically a centrally decreasing diameter, and rotational symmetry with respect to axis A of the shaft 22, so achieving a fulcrum taking the shape of a hourglass (in Italian: "fulcro a clessidra", or hourglass-like fulcrum).

The resiliently deformable portion 26 accommodates limited leanings of the abutment portion 27 with respect to axis A, while the guide portion 25 is constrained to axially slide within the guide bushing 30. Thus, the transversal components of the thrust that the abutment surface 21 of the abutment portion 27 undergoes are not transmitted to the guide portion 25, and the latter can be coupled to the guiding bushing 30 substantially free of play without any risk of seizure, so guaranteeing that the end transversal surface 23 performs plain axial translations.

The resiliently deformable portion 26 may feature a different layout with respect to the hourglass shaped fulcrum as is shown in the figures, and be obtained by processing the shaft 22, or achieved as a separate component that is inserted between, and fixed to, the guide portion 25 and the abutment portion 27, and may ensures flexures in any directions transversal to axis A, or just in some determined preferred directions (for instance direction X that is represented in FIG. 1 by means of a double arrow).

Abutment surface 21 may have a different shape with respect to the substantially spherical one that is shown in the figures and may assume for instance the shape of a wedge with slanting surfaces opposite to each other, or may have a substantially planar shape with a circular edge, depending on the specific apparatus wherein the mechanical transmission assembly 20 is used, and on corresponding movable parts and thrust surfaces which it stands in contact with. The latter may have various shapes, as it is known and shown in the already mentioned U.S. Pat. No. 4,170,831.

The end transversal surface 23, too, that in the figures is shown as a substantially planar surface, may have a different shape, depending on the specific apparatus wherein the mechanical transmission assembly 20 is used, and on the transducer and/or display device that is employed. For instance, the shape can be spherical or generically convex, but also concave, more specifically a substantially conical, spherical or prismatic one.

The guiding bushing 30 may be obtained in a per se known way, and may include, for instance, guiding surfaces or interposed elements, such as ball bearings.

In an apparatus like the one of FIG. 1, the transducer and/or display device may be different with respect to the dial indicator 33, and may include, for instance, a checking head or a known transducer of one of various kinds (inductive, optical, pneumatic, or of another kind) that is connected to a proper processing unit.

Figures from 3 to 6 show other examples of applications of the mechanical transmission assembly 20 according to the present invention.

More specifically, FIG. 3 shows a plug comparator similar to the one of FIG. 1, wherein each one of the feelers 7, 8 is fixed to an arm 44, 45 of the armset having a parallelogram-like structure, with two longitudinal mutually parallel elements and two pairs of reduced cross-section portions that define four fulcra.

Figure 5:
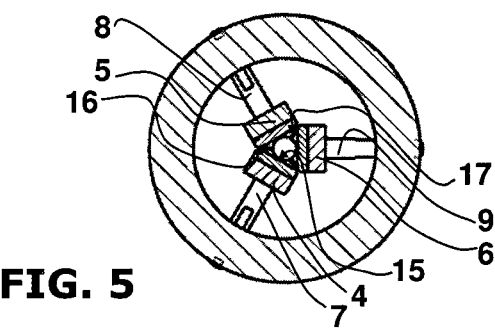
FIG. 5 is a transversal cross-sectional view of the apparatus of FIG. 4, taken along line V-V of FIG. 4.
Figure 4:
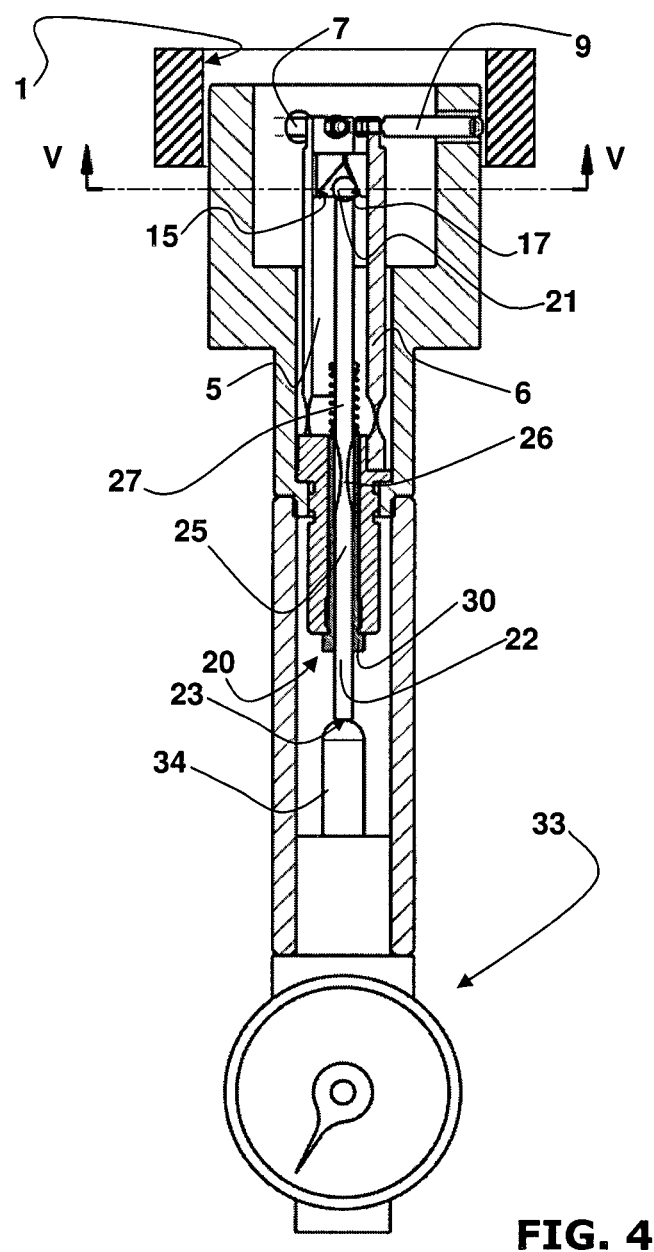
FIG. 4 is a longitudinal cross-sectional view of a checking apparatus of the "plug" type according to a third embodiment of the invention.

FIGS. 4 and 5 show another plug comparator, wherein the armset carries three feelers 7, 8 and 9 arranged at 120° one from the other and radially movable, and defines three inclined thrust surfaces 15, 16 and 17, in contact with the abutment surface 21 of the mechanical transmission assembly 20. More specifically, the armset includes three movable arms 4, 5 and 6, each carrying one of the three feelers 7, 8 and 9 and defining one of the three thrust surfaces 15, 16 and 17. Each movable arm 4, 5 and 6 allows the associated feeler 7, 8 and 9 and the associated thrust surface 15, 16 and 17 to perform substantially radial displacements, independently from the other two feelers and thrust surfaces. As a consequence of the contact with the surface of the hole to be checked (the latter being identified in FIG. 4 with the same reference number, 1, that is used in FIG. 1), each feeler 7, 8 and 9 and the associated thrust surface 15, 16 and 17 radially move and transmit the movement to the shaft 22 of the mechanical transmission assembly 20 that is pushed to translate along an axial direction. The transversal surface 23 of the shaft 22 pushes the axially movable part 34 of the indicator 33 that provides an information about variations of the checked dimension of hole 1.

As described above with reference to the embodiment of FIG. 1, the resiliently deformable portion 26 accommodates limited leanings of the abutment portion 27 with respect to axis A, while the guide portion 25 is constrained to axially slide within the guide bushing 30. Thus, the transversal components of the thrust that the abutment surface 21 of the abutment portion 27 undergoes are not transmitted to the guide portion 25, and the latter can be coupled to the guiding bushing 30 substantially free of play without any risk of seizure, so guaranteeing that the end transversal surface 23 performs plain axial translations.

The limited leanings that the abutment portion 27 may undergo with respect to the axis A, additionally render easier the set up operations as far as the radial position of the three feelers 7, 8 and 9 in non-operative condition is concerned, that is they render easier, during the set up and when the set-up is completed, keeping the proper coupling between every thrust surfaces 15, 16 and 17 and the abutment surface 21 at the end of the shaft 22.

Figure 7:
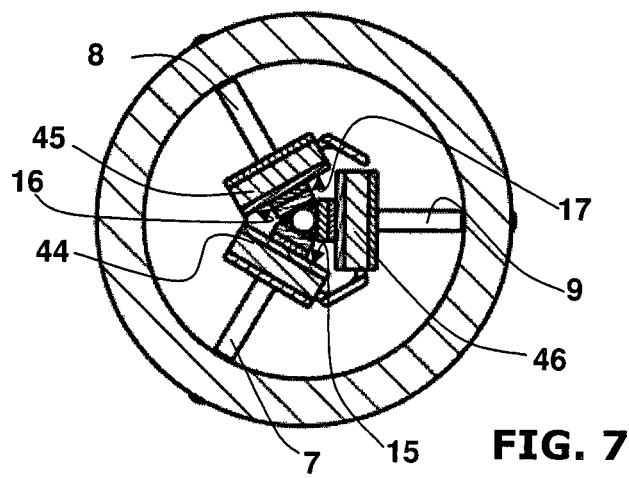
FIG. 7 is a transversal cross-sectional view of the apparatus of FIG. 6, taken along line VII-VII of FIG. 6.
Figure 6:
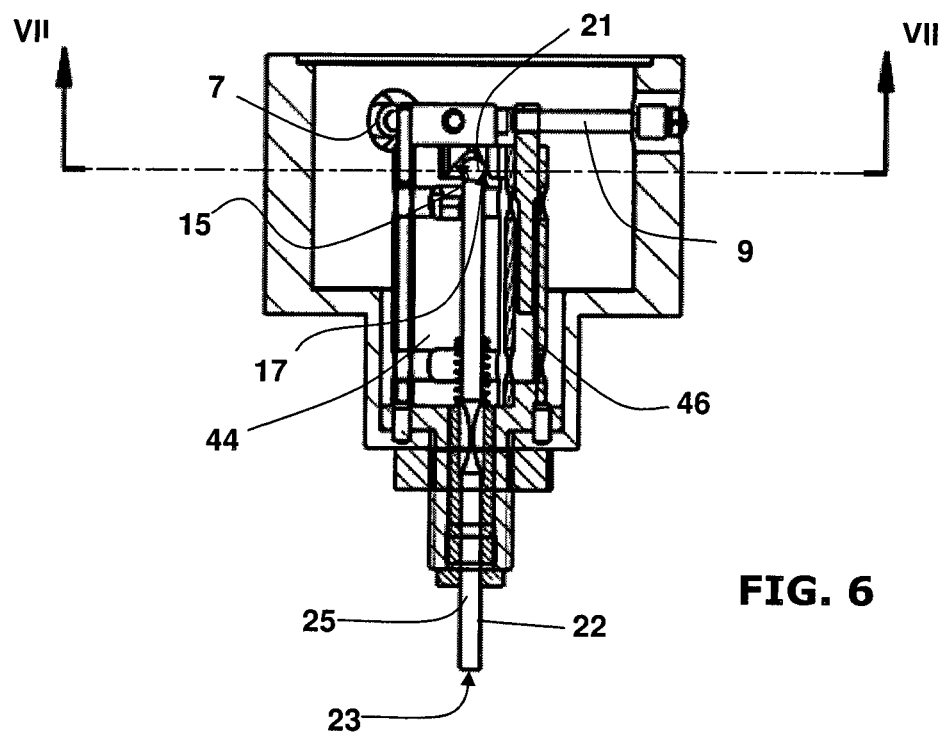
FIG. 6 is a longitudinal cross-sectional view of some components of a checking apparatus, more specifically a "plug" comparator, according to a fourth embodiment of the invention.

FIGS. 6 and 7 show some components of a plug comparator similar to the one of FIGS. 4 and 5, wherein each one of the feelers 7, 8 and 9 is fixed to an arm 44, 45, 46 of the armset having a parallelogram-like structure, each structure having two longitudinal mutually parallel elements and two pairs of reduced cross-section portions that define four fulcra. For the sake of simplicity, FIG. 6 shows neither any processing and/or display devices, nor the associated components for fixing to the frame 3.

Figure 8:
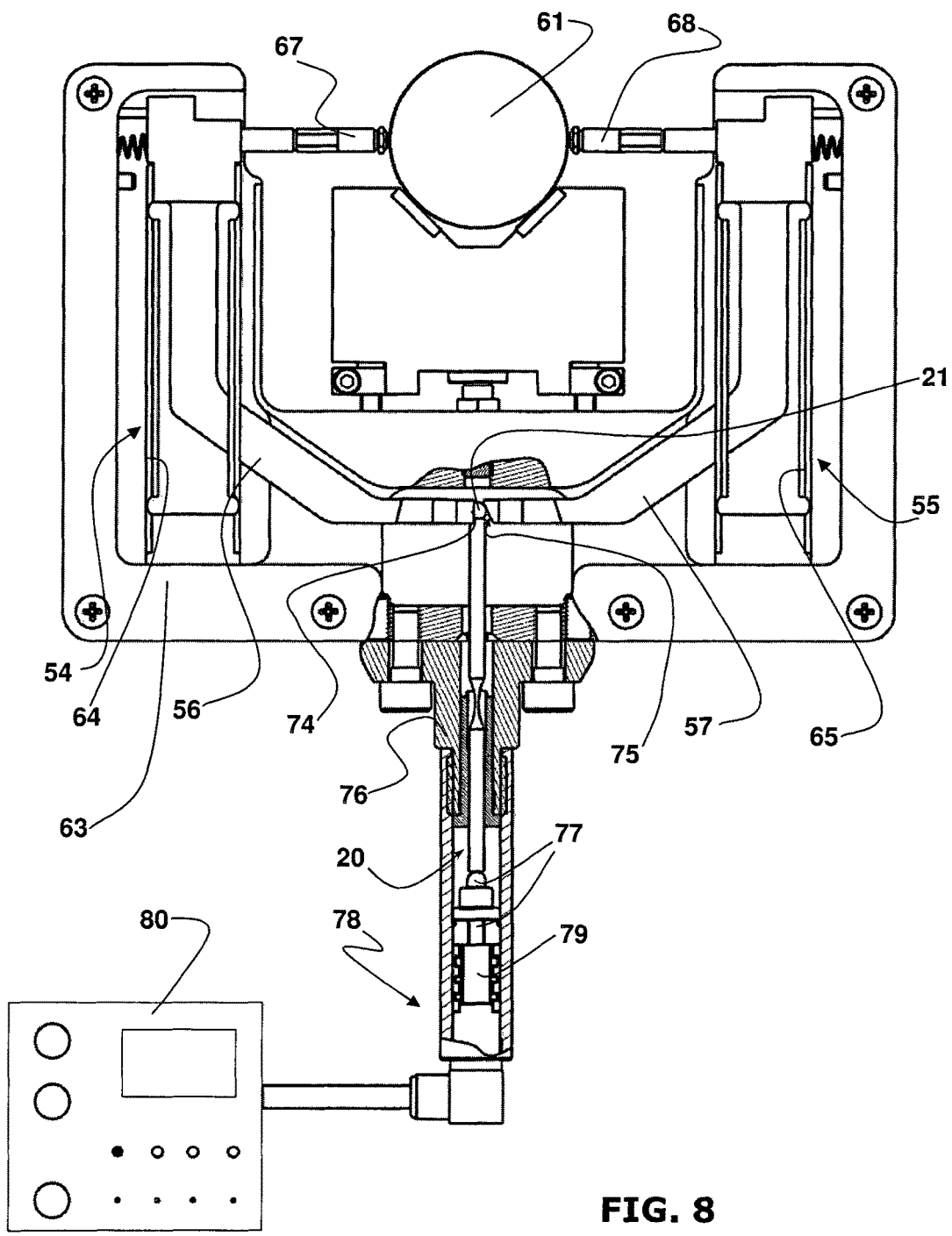
FIG. 8 is lateral view, with some cross-sectioned parts, of a checking apparatus, more specifically a "snap" comparator, according to another possible embodiment of the invention.

FIG. 8 shows the mechanical transmission assembly 20 as used in an apparatus of the "snap" kind for checking external shape or dimensions, more specifically diametral dimensions of a mechanical part 61 having a cylindrical shape. The apparatus includes a housing or supporting frame 63 to which armsets are fixed, the armsets including arms 54 and 55 with shaped elements 56, 57 connected to parallelogram-like structures 64 and 65, structures that are per se known and allow the shaped elements 56, 57 to perform substantially plain translation movements with respect to the supporting frame 63. Two feelers 67 and 68 are fixed at the end of each one of the shaped elements 56 and 57, respectively, and touch the surface of the mechanical part 61 to be checked, typically at diametrically opposite positions. The other ends of the shaped elements 56 and 57 define thrust surfaces 74 and 75, inclined and opposite to each other, that stand in contact with the abutment surface 21 of the mechanical transmission assembly 20 that has already been described above. In the illustration of FIG. 8 the thrust surface 74 having, for instance, a V-shaped profile, is not visible and hides a part of the (spherical) abutment surface 21. The mechanical transmission assembly 20 is coupled to the frame 63 in a known way, for instance by means of a threaded coupling to a fixing mechanical element 76. The transversal surface 23 of the shaft 22 cooperates with the free end of an axially movable element 77 of a transducer device 78 that is fixed to the frame (for instance it is fixed to the fixing mechanical element 76 by means of a threaded coupling) and is adapted to provide electrical signals indicative of the displacements of the feelers 67, 68. For instance, the transducer device 78 may include a checking head having its own axial moving parts, or an inductive transducer—schematically indicated in the figure with the reference number 79—that is electrically connected to a processing and display unit 80.

Other applications according to the present invention of the mechanical transmission assembly 20 are possible, in various kinds of apparatuses: ring gauging or measuring heads for checking external diametral dimensions, axial gauging/measuring heads, and others.

Among further advantages that are bound to the use, in a checking apparatus and according to the present invention, of the mechanical transmission assembly, it is to be mentioned that, thanks to the fact that the guide portion defining the transversal surface 23 translates with substantially negligible backlash, in order to increase the repeatability of the apparatus it is not needed to make sure that the shaft 22 do not take different angular positions around axis A; as a consequence, achieving anti-rotation mechanisms is not needed, so simplifying the system structure and the needed processing.

Other apparatuses embodying the present invention may comprise only one movable feeler connected to an associated armset, and a single thrust surface connected to the movable armset and in contact with the abutment surface of the mechanical transmission assembly.

The invention claimed is:

1. Apparatus for checking dimensions and/or shape of a mechanical part comprising:
    a supporting frame,
    one or more feelers movable with respect to the supporting frame and adapted to touch a surface of the mechanical part to be checked,
    an armset coupled to the supporting frame, carrying said one or more feelers and comprising one or more thrust surfaces in correspondence of said one or more feelers, said abutment portion of the shaft defining an end abutment surface that is in contact with said one or more thrust surfaces of the armset,
    a transducer and/or display device for detecting displacements of said one or more feelers, including a movable part, and
    a mechanical transmission assembly coupled to said one or more feelers and to said transducer and/or display device and comprising:
        a shaft defining an axis, and
        a guiding element adapted to cooperate with the shaft and to guide movements of the shaft along an axial direction,
    said movable part of the transducer and/or display device being adapted to move substantially along said axial direction,
    wherein said shaft of the mechanical transmission assembly comprises:
    an abutment portion adapted to cooperate with said one or more feelers,
    a guide portion that is at least partially housed in the guiding element and defines an end transversal surface in contact with said movable part of the transducer and/or display device, and
    a resiliently deformable portion between said abutment portion and guide portion.

2. The apparatus according to claim 1, comprising three feelers, the armset carrying said three feelers and defining three thrust surfaces, the end abutment surface being in contact with said three thrust surfaces of the armset.

3. The apparatus according to claim 2, wherein the armset comprises three movable arms, and each of the three movable arms carries one of the three feelers, defines one of the three thrust surfaces, and allows the associated feeler and the associated thrust surface to perform substantially radial displacements, independently from the other two feelers and thrust surfaces.

4. The apparatus according to claim 3, wherein said resiliently deformable portion of the shaft has decreasing diameter and rotational symmetry with respect to said axis.

5. The apparatus according to claim 2, wherein said resiliently deformable portion of the shaft has decreasing diameter and rotational symmetry with respect to said axis.

6. The apparatus according to claim 1, wherein said transducer and/or display device comprises a transducer adapted to provide electrical signals indicative of the displacements of said one or more feelers.

7. The apparatus according to claim 6, wherein said resiliently deformable portion of the shaft has decreasing diameter and rotational symmetry with respect to said axis.

8. The apparatus according to claim 1, wherein said one or more thrust surfaces of the armset are inclined surfaces.

9. The apparatus according to claim 8, wherein said resiliently deformable portion of the shaft has decreasing diameter and rotational symmetry with respect to said axis.

10. The apparatus according to claim 1, wherein said end abutment surface has a substantially spherical shape.

11. The apparatus according to claim 10, wherein said resiliently deformable portion of the shaft has decreasing diameter and rotational symmetry with respect to said axis.

12. The apparatus according to claim 1, wherein said resiliently deformable portion of the shaft has decreasing diameter and rotational symmetry with respect to said axis.

* * * * *